United States Patent
Kurihara et al.

(10) Patent No.: US 9,442,194 B2
(45) Date of Patent: Sep. 13, 2016

(54) DUMP TRUCK WITH OBSTACLE DETECTION MECHANISM AND METHOD FOR DETECTING OBSTACLE

(71) Applicant: Komatsu Ltd., Tokyo (JP)

(72) Inventors: Takeshi Kurihara, Hiratsuka (JP); Masaomi Machida, Hiratsuka (JP); Dai Tsubone, Hiratsuka (JP); Yukihiro Nakanishi, Hiratsuka (JP); Tomikazu Tanuki, Fujisawa (JP); Shinji Mitsuta, Hiratsuka (JP); Shigeru Harada, Chigasaki (JP); Eishin Masutani, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 66 days.

(21) Appl. No.: 13/879,458

(22) PCT Filed: Sep. 19, 2012

(86) PCT No.: PCT/JP2012/073940
§ 371 (c)(1),
(2) Date: Apr. 15, 2013

(87) PCT Pub. No.: WO2013/136564
PCT Pub. Date: Sep. 19, 2013

(65) Prior Publication Data
US 2014/0375503 A1    Dec. 25, 2014

(30) Foreign Application Priority Data
Mar. 15, 2012    (JP) .................. 2012-059399

(51) Int. Cl.
*G01S 13/93* (2006.01)
*G01S 13/86* (2006.01)
(Continued)

(52) U.S. Cl.
CPC .............. *G01S 13/931* (2013.01); *B60R 1/00* (2013.01); *G01S 13/86* (2013.01); *G01S 13/87* (2013.01);
(Continued)

(58) Field of Classification Search
CPC ...... G01S 13/931; G01S 13/86; G01S 13/87; G01S 2013/9378; G01S 2013/9375; G08G 1/166; G08G 1/16; B60R 1/00; B60R 2300/301; B60R 2300/607; B60R 2300/105
USPC ......... 342/70–72, 27, 59; 701/301; 340/431, 340/433, 435–436, 903
See application file for complete search history.

(56) References Cited

U.S. PATENT DOCUMENTS 4,210,357 A    7/1980    Adachi
4,465,155 A *  8/1984    Collins .................... B62D 1/28
                                                                180/169

(Continued)

FOREIGN PATENT DOCUMENTS

CN    201576094 U    9/2010
JP    54-045040 A    4/1979
(Continued)

OTHER PUBLICATIONS

Decision of a Patent Grant mailed Dec. 9, 2014, issued for the corresponding Japanese patent application No. 2012-059399 and English translation thereof.
(Continued)

*Primary Examiner* — John B Sotomayor
(74) *Attorney, Agent, or Firm* — Locke Lord LLP

(57) ABSTRACT

A dump truck includes radars attached, facing backward, to a position projected sideward a front fender extended from a lower deck to an upper deck of a front side of the vehicle, in which an irradiation beam has an angle of dip to cross at least a front wheel; and radars attached, facing sideward, to the side of the lower deck, and the radars and the radars are arranged such that a horizontal forward detection limit line of each of the radar and a horizontal backward detection limit line of each of the radar overlap and the horizontal backward detection limit lines of the radar are directed to a side of a center plane of the vehicle to detect the obstacle in the side of the vehicle.

7 Claims, 16 Drawing Sheets

(51) Int. Cl.
*G01S 13/87* (2006.01)
*B60R 1/00* (2006.01)
*G08G 1/16* (2006.01)

(52) U.S. Cl.
CPC ............... *G08G 1/16* (2013.01); *G08G 1/166* (2013.01); *B60R 2300/105* (2013.01); *B60R 2300/301* (2013.01); *B60R 2300/607* (2013.01); *G01S 2013/9375* (2013.01); *G01S 2013/9378* (2013.01)

(56) References Cited

U.S. PATENT DOCUMENTS

| | | | | |
|---|---|---|---|---|
| 5,389,824 A | * | 2/1995 | Moroto | B60K 28/14 180/283 |
| 5,389,912 A | * | 2/1995 | Arvin | B60Q 1/52 116/67 R |
| 6,100,796 A | | 8/2000 | Wagner et al. | |
| 6,268,803 B1 | * | 7/2001 | Gunderson | B60Q 9/006 180/168 |
| 6,642,839 B1 | * | 11/2003 | Gunderson | G01S 13/931 340/435 |
| 7,315,235 B1 | * | 1/2008 | Fairchild | B60Q 1/50 340/425.5 |
| 8,462,204 B2 | * | 6/2013 | Schofield | B60R 1/00 348/113 |
| 9,250,315 B2 | * | 2/2016 | Yonak | G01S 3/8083 |
| 9,262,923 B2 | * | 2/2016 | Chang | G01S 13/86 |
| 9,291,709 B2 | * | 3/2016 | Mitsuta | B60R 1/00 |
| 2002/0005778 A1 | * | 1/2002 | Breed | B60Q 9/008 340/435 |
| 2002/0097146 A1 | * | 7/2002 | Harris, III | B60Q 9/008 340/435 |
| 2003/0107900 A1 | * | 6/2003 | Ellison | B60Q 1/32 362/485 |
| 2007/0018888 A1 | | 1/2007 | Fujikawa et al. | |
| 2007/0182528 A1 | * | 8/2007 | Breed | B60Q 9/008 340/435 |
| 2008/0106436 A1 | * | 5/2008 | Breed | B60N 2/2863 340/905 |
| 2009/0259399 A1 | | 10/2009 | Kotejoshyer et al. | |
| 2009/0259400 A1 | | 10/2009 | Coats et al. | |
| 2010/0019935 A1 | * | 1/2010 | Kawabata | B60R 1/00 340/932.2 |
| 2010/0277297 A1 | * | 11/2010 | Eckel | G01S 7/524 340/435 |
| 2013/0141581 A1 | * | 6/2013 | Mitsuta | B60R 1/00 348/148 |
| 2013/0169469 A1 | * | 7/2013 | Mitsuta | B60R 1/00 342/52 |
| 2014/0266859 A1 | * | 9/2014 | Kurihara | G01S 13/86 342/70 |
| 2014/0347483 A1 | * | 11/2014 | Nakanishi | B60R 11/04 348/148 |
| 2014/0375503 A1 | * | 12/2014 | Kurihara | G01S 13/86 342/385 |
| 2015/0077281 A1 | * | 3/2015 | Taniguchi | B60R 1/00 342/27 |
| 2015/0183370 A1 | * | 7/2015 | Nakanishi | E02F 9/261 348/148 |
| 2015/0210213 A1 | * | 7/2015 | Mitsuta | B60P 1/283 340/435 |
| 2015/0217690 A1 | * | 8/2015 | Mitsuta | B60R 1/00 348/148 |
| 2015/0217691 A1 | * | 8/2015 | Tanuki | E02F 9/261 348/148 |
| 2015/0222858 A1 | * | 8/2015 | Tanuki | B60R 1/00 348/148 |
| 2015/0326829 A1 | * | 11/2015 | Kurihara | H04N 7/181 348/148 |

FOREIGN PATENT DOCUMENTS

| | | |
|---|---|---|
| JP | 62-46384 U | 3/1987 |
| JP | 03-014100 A | 1/1991 |
| JP | 08-240663 A | 9/1996 |
| JP | 11-258343 A | 9/1999 |
| JP | 2002-172978 A | 6/2002 |
| JP | 2006-253872 A | 9/2006 |
| JP | 2006-300722 A | 11/2006 |
| JP | 2007-237964 A | 9/2007 |
| JP | 2008-145237 A | 6/2008 |
| JP | 2010-197378 A | 9/2010 |
| JP | 2012-038048 A | 2/2012 |
| JP | 2013195084 A * | 9/2013 |
| JP | 2013195086 A * | 9/2013 |

OTHER PUBLICATIONS

Todd Ruff, "Evaluation of a radar-based proximity warning system for off-highway dump trucks," Accident Analysis and Prevention 38, 2006, pp. 92-98.

International Search Report dated Dec. 18, 2012, issued for PCT/JP2012/073940 (in Japanese langauage).

* cited by examiner

DUMP TRUCK WITH OBSTACLE DETECTION MECHANISM AND METHOD FOR DETECTING OBSTACLE

This application is the National Stage under 35 U.S.C. §371 of International Application No. PCT/JP2012/073940, filed on Sep. 19, 2012, which claims the benefit under 35 U.S.C. §119 of Japanese Application No. JP2012-059399, filed on Mar. 15, 2012.

FIELD

The present invention relates to a dump truck with an obstacle detection mechanism that is able to detect an obstacle around a vehicle using a plurality of radars provided on a peripheral of the vehicle and a method for detecting the obstacle.

BACKGROUND

The dump trucks used for mine operation and the like have much wider vehicle width (for example, about 9 m) and much higher vehicle height (for example, about 7 m) than general trucks or buses. Then, since the driver's cab is provided on the left side of the upper deck of the front part of the vehicle, the driver may have difficulty in seeing the right direction.

Therefore, in the dump truck, a plurality of cameras are installed on the peripheral of the vehicle in order to monitor the periphery of the vehicle, and the periphery monitoring is made based on the images obtained by these cameras. Further, a plurality of radars are installed on the peripheral of the vehicle and the detection of the obstacle around the vehicle is made based on the data obtained by these radars (see Patent Literatures 1 and 2).

CITATION LIST

Patent Literature

Patent Literature 1: U.S. Patent Application Publication No. 2009/0259399
Patent Literature 2: U.S. Patent Application Publication No. 2009/0259400

SUMMARY

Technical Problem

In the conventional dump truck, however, the radar for detecting the obstacle in the side of the vehicle is located on the upper deck of the vehicle front and the irradiation direction is directed to the side-outward and it is therefore impossible to detect the obstacle, in particular, in the side-back area of the dump truck.

The present invention has been made to address the above problem, and its purpose is to provide a dump truck with an obstacle detection mechanism that is able to detect an obstacle in the side of the vehicle including the side-back area of the dump truck and a method for detecting the obstacle.

Solution to Problem

To overcome the problems and achieve the object, according to the present invention, a dump truck with an obstacle detection mechanism capable of detecting an obstacle around a vehicle using a plurality of radars provided on a periphery of the vehicle, the dump truck comprises: a backward irradiation side-radar attached, facing backward, to a position projected sideward from a front fender extended from a lower deck to an upper deck of a front side of the vehicle, wherein an irradiation beam from the backward irradiation side-radar has an angle of dip to cross at least a front wheel; and a sideward irradiation side-radar attached, facing sideward, to a side of the lower deck, wherein the backward irradiation side-radar and the sideward irradiation side-radar are arranged such that a horizontal forward detection limit line of the backward irradiation side-radar and a horizontal backward detection limit line of the sideward irradiation side-radar overlap and the horizontal backward detection limit line of the backward irradiation side-radar is directed to a side of a center plane of the vehicle to detect an obstacle in a side of the vehicle.

According to the present invention, a horizontal detection range of the backward irradiation side-radar is equal to or greater than 80 degrees and an angle between a horizontal irradiation center axis of the backward irradiation side-radar and the center plane of the vehicle is equal to or less than 45 degrees.

According to the present invention, an obstacle processing unit having the obstacle detection mechanism excludes information of a vehicle area detected by the backward irradiation side-radar from obstacle detection information.

According to the present invention, the backward irradiation side-radar and the sideward irradiation side-radar are provided under a vessel.

According to the present invention, the backward irradiation side-radar and the sideward irradiation side-radar are provided to an opposite side of a cab with respect to the center plane of the vehicle.

According to the present invention, a dump truck with an obstacle detection mechanism capable of detecting an obstacle around a vehicle using a plurality of radars provided on a periphery of the vehicle, the dump truck comprises: a plurality of backward radars arranged in left and right with respect to a center plane of the vehicle in a backside of a rear axle case and between joints of rear suspension cylinders and the rear axle case, wherein respective radars are arranged such that irradiation center axes of the radars in a horizontal direction cross and irradiation center axes of the radars in a vertical direction have a predetermined angle of dip, respectively; a plurality of forward radars arranged in left and right with respect to the center plane of the vehicle in a front part of a lower deck of a front side of the vehicle, wherein respective radars are arranged such that irradiation center axes of the radars in a horizontal direction cross and irradiation center axes of the radars in a vertical direction have a predetermined angle of dip, respectively; backward irradiation side-radars arranged in left and right and attached, facing backward, to positions projected sideward from a front fender extended from the lower deck to an upper deck, wherein each of horizontal backward detection limit lines of the backward irradiation side-radars is directed to a side of the center plane of the vehicle and each of irradiation center plane of the backward irradiation side-radars in a vertical direction has an angle of dip to cross at least a front wheel; and sideward irradiation side-radars arranged in left and right and attached, facing sideward, to sides of the lower deck, wherein each of horizontal detection ranges of the sideward irradiation side-radars includes a horizontal forward detection limit line of the backward irradiation side-radar, wherein the dump truck detects obstacle around entire surroundings of the vehicle.

According to the present invention, a method of obstacle detection in a dump truck with an obstacle detection mechanism attached, facing backward, to a position projected sideward from a front fender extended from a lower deck to an upper deck of a front side of the vehicle and capable of detecting an obstacle in a side of a vehicle, the method comprises: detecting obstacle information by a backward irradiation side-radar whose irradiation beam has an angle of dip to cross a front wheel; and excluding obstacle information in a preset vehicle area that indicates the vehicle.

According to the present invention, the dump truck includes a backward irradiation side-radar attached, facing backward, to a position projected sideward from a front fender extended from a lower deck to an upper deck of a front side of the vehicle, in which an irradiation beam has an angle of dip to cross at least a front wheel; and a sideward irradiation side-radar attached, facing sideward, to the side of the lower deck, and the backward irradiation side-radar and the sideward irradiation side-radar are arranged such that a horizontal forward detection limit line of the backward irradiation side-radar and a horizontal forward detection limit line of the sideward irradiation side-radar overlap and the horizontal forward detection limit line of the backward irradiation side-radar is directed to a side of a center plane of the vehicle to detect an obstacle in the side of the vehicle, so that the obstacle in the side of the vehicle including the side area of the vessel can be detected, which, as a result, allows for the detection of the obstacle around the entire surroundings of the vehicle.

DESCRIPTION OF EMBODIMENTS

An embodiment for implementing the present invention will be described below by referring to the attached drawings. It is noted that, in the following descriptions, regarding "forward" and "backward", the direction with respect to the direction facing the front from the cab is defined as "forward" and the opposite direction is defined as "backward". "Left" and "right" refer to respective directions with respect to the vehicle center plane C described later at the time of directing toward "forward" direction.

Overall Arrangement

Figure 1:
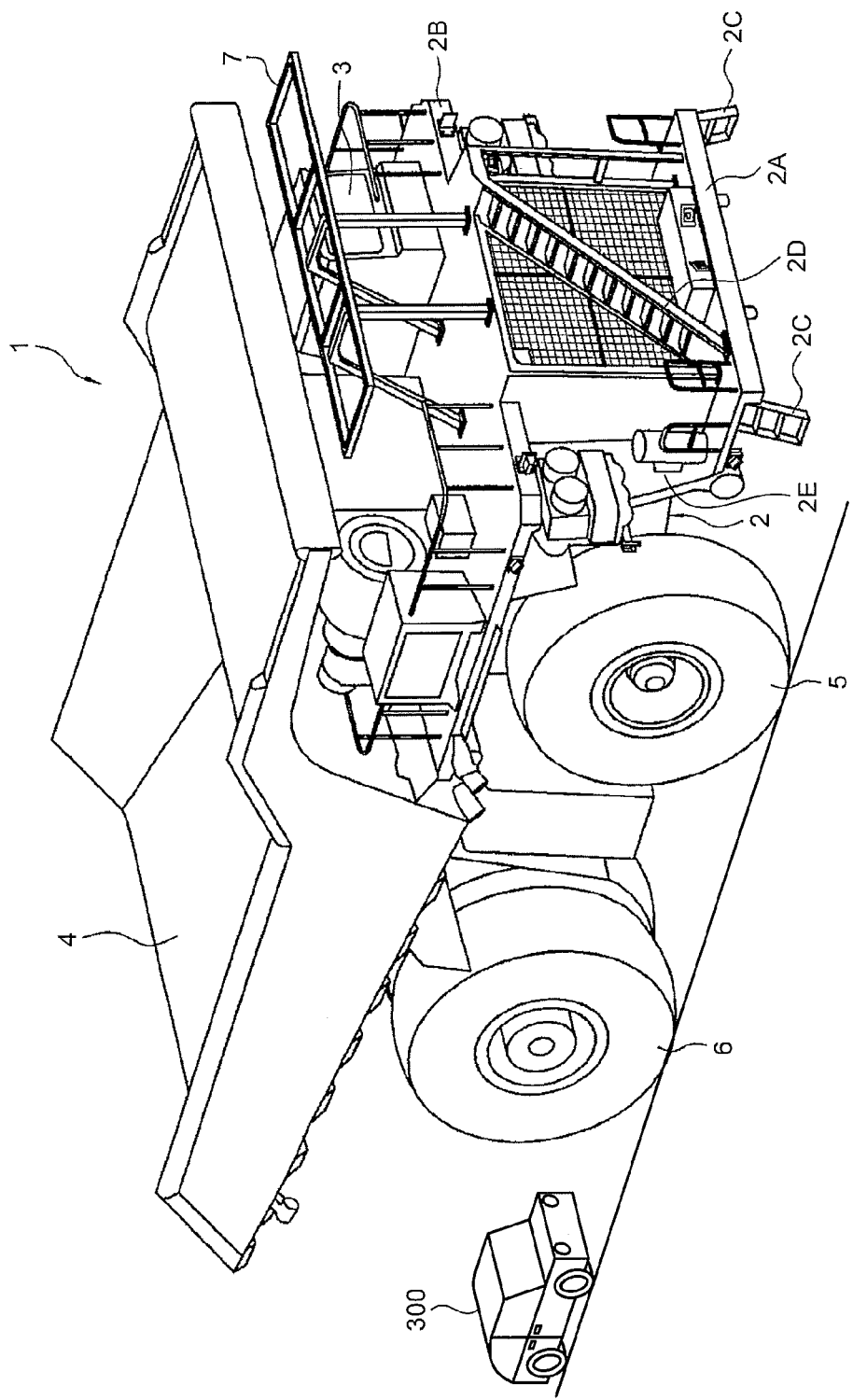
FIG. 1 is a perspective view illustrating an outline structure of a dump truck of an embodiment of the present invention.

FIG. 1 a perspective view illustrating an outline structure of a dump truck of the embodiment of the present invention. As illustrated in FIG. 1, a dump truck 1 is an extra-large vehicle for operation used for the mine operation and the like and has a vehicle width over 9 m. The size of this dump truck 1 can be easily recognized in comparison to a pickup truck 300 illustrated in FIG. 1. The dump truck 1 has mainly a body frame 2, a cab 3, a pair of left and right front wheels 5 and a pair of left and right rear wheels 6 each of which has two wheels in a pair, a base 7 on which a power supply pantograph is installed, and a periphery monitoring device 10 (see FIG. 3).

The body frame 2 supports a motive power mechanism such as a diesel engine, a transmission, and the like, and/or other auxiliary machinery. Further, the body frame 2 supports the pair of left and right front wheels 5 in the front part and supports the pair of left and right rear wheels 6 in the rear part of the vehicle. The body frame 2 has a lower deck 2A provided close to the ground in the front part and an upper deck 2B provided above the lower deck 2A.

A pair of movable ladders 2C for getting on and off are provided to both sides between the lower deck 2A and the ground. A diagonal ladder 2D for one to walk between the lower deck 2A and the upper deck 2B is provided between the lower deck 2A and the upper deck 2B. Further, a front fender 2E extended from the lower deck 2A to the upper deck 2B is arranged near the front wheel 5.

Figure 2:
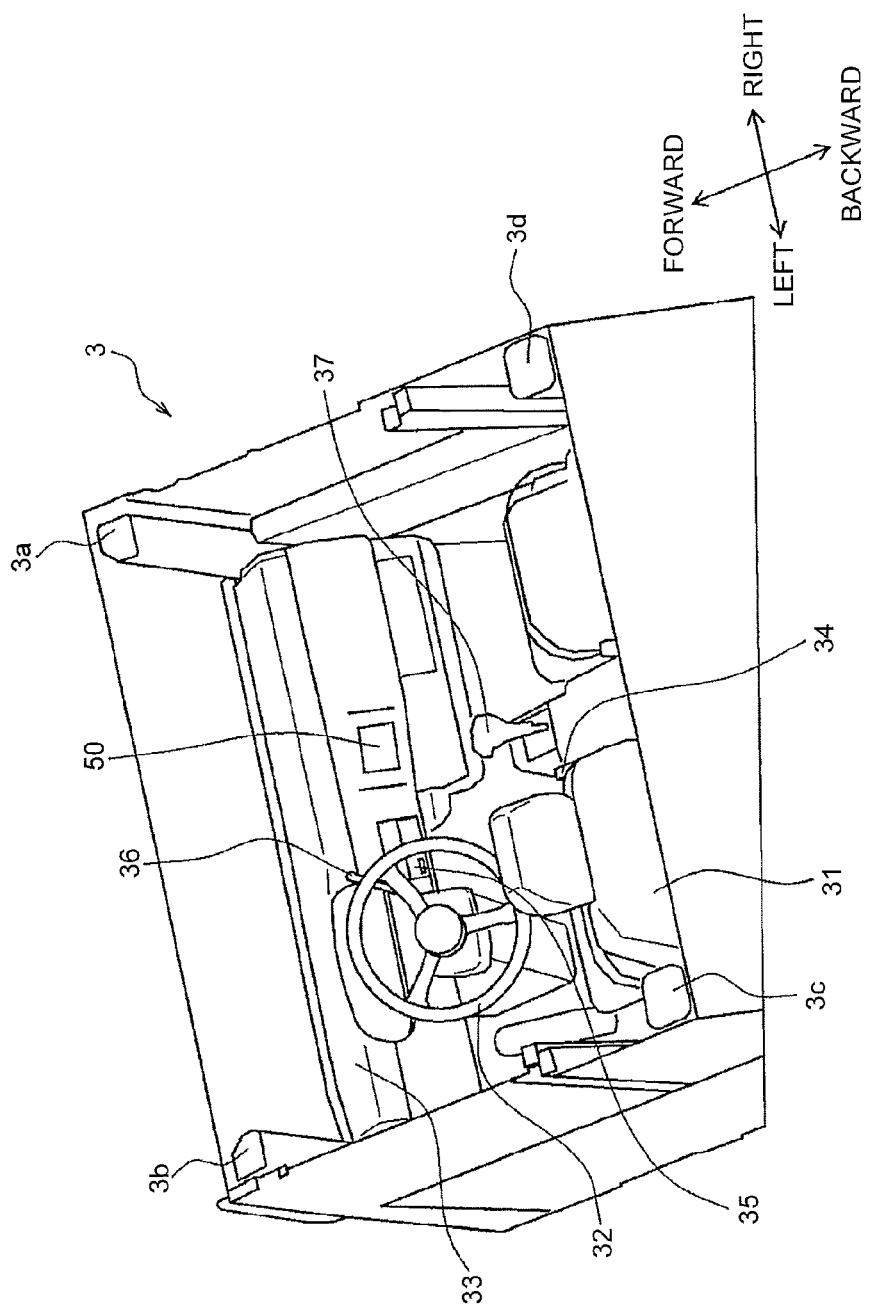
FIG. 2 is a view illustrating an internal structure of a driver seat.

The cab 3 is arranged to the left side on the upper deck 2B. As illustrated in FIG. 2, the cab 3 is provided with four supports 3a, 3b, 3c, and 3d to form a protection structure for a case of overturn. Within the cab 3, provided are a driver seat 31, a handle 32, a dash cover 33, a radio device 34, a radio broadcast receiver 35, a retarder 36, a shift lever 37, a controller 100 (see FIG. 3), a monitor 50, an accelerator pedal, a brake pedal, and so on.

A vessel 4 is a load-carrying platform for loading heavy load such as crushed rocks and is rotatably connected to the rear end part of the body frame 2 via a rotation shaft at the rear bottom part. The vessel 4 is revolved with respect to a revolve shaft by an actuator such as a hydraulic cylinder, so that the vessel 4 can be revolved within a range between an election position for raising the front part of the vessel 4 to discharge the load and a loading position in which the front part thereof is positioned above the top of the cab 3 as illustrated in FIG. 1.

Arrangement of the Periphery Monitoring Device

Figure 3:
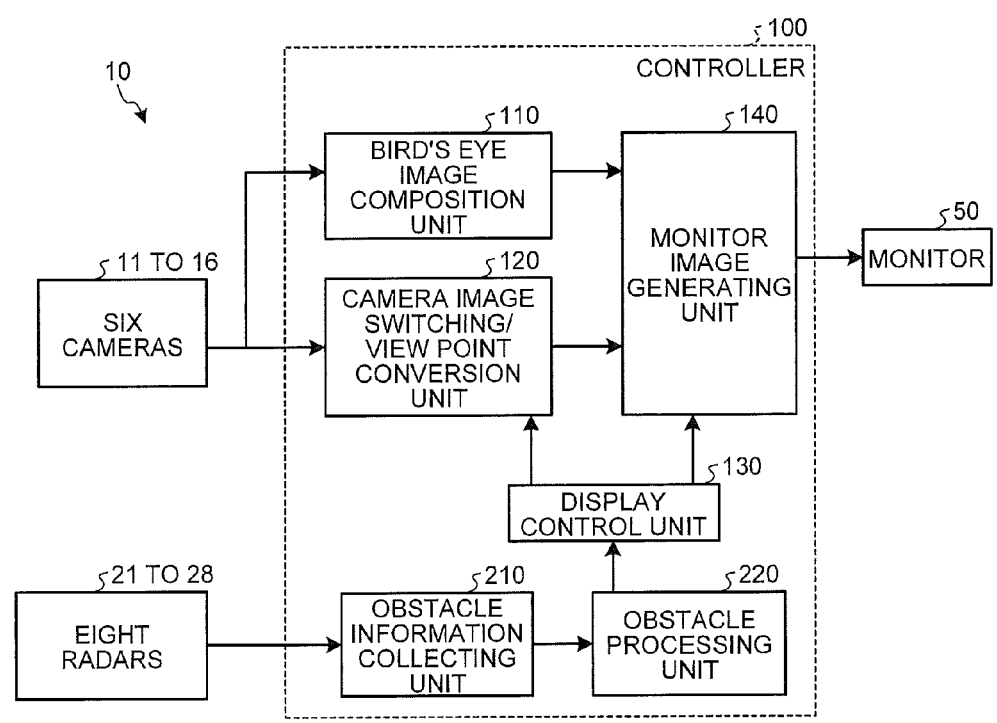
FIG. 3 is a block diagram illustrating an arrangement of the periphery monitoring device.

As illustrated in FIG. 3, the periphery monitoring device 10 has six cameras 11 to 16 arranged on the peripheral of the dump truck 1, eight radars 21 to 28 arranged on the peripheral of the dump truck 1, a monitor 50, and the controller 100.

The controller 100 uses the cameras 11 to 16 to display, by bird's-eye views, the presence or absence of an obstacle having a size of a car and the like that may occur in the surroundings of the dump truck 1 so as to allow the driver to monitor them, and uses the radars 21 to 28 to allow for alarming the presence of the obstacle to the driver. As illustrated in FIG. 3, the controller 100 has a bird's-eye image composition unit 110, a camera image switching/view point conversion unit 120, a display control unit 130, a monitor image generation unit 140, an obstacle information collecting unit 210, and an obstacle processing unit 220.

The bird's-eye image composition unit 110 is connected to the cameras 11 to 16 to receive the image data obtained by respective cameras 11 to 16. The bird's-eye image composition unit 110 composes a plurality of received image data to generate a bird's-eye image including the entire surroundings of the dump truck 1. Specifically, by applying a coordinate conversion on the plurality of image data, the bird's-eye image composition unit 110 generates the bird's-eye image data indicating a bird's-eye image in which a plurality of images are projected on a predetermined projecting plane.

The camera image switching/view point conversion unit 120 is connected to the cameras 11 to 16 and, based on the detection result of the obstacle by the radars 21 to 28, switches the captured image from each of the cameras 11 to 16 that is displayed on the screen of the monitor 50 along with the bird's-eye images. Further, the camera image switching/view point conversion unit 120 converts the captured image obtained by each of the cameras 11 to 16 into an image whose view point is in the infinite distance of the upper position of the dump truck.

The display control unit 130 is connected to the camera image switching/view point conversion unit 120, the monitor image generation unit 140, and the obstacle processing unit 220. The display control unit 130 composes the images obtained by respective cameras 11 to 16. The display control unit 130 sends out the obstacle position data to the camera image switching/view point conversion unit 120 and the monitor image generation unit 140 by composing and displaying the obstacle position information obtained by the radars 21 to 28 into the bird's-eye image formed at the bird's-eye image composition unit 110.

The monitor image generation unit 140 is connected to the bird's-eye image composition unit 110, the camera image switching/view point conversion unit 120, and the display control unit 130. Based on the image data and the obstacle position data of the entire surroundings of the dump truck obtained by the cameras 11 to 16 and the radars 21 to 28, the monitor image generation unit 140 generates an image in which the position of the obstacle is included on the bird's-eye image and sends it out to the monitor 50. The monitor 50 displays the obstacle in the display area, so that the driver is able to recognize the presence of the obstacle.

The obstacle information collecting unit 210 is connected to the radars 21 to 28 and the obstacle processing unit 220. The obstacle information collecting unit 210 receives respective obstacle detection results detected by the radars 21 to 28 and sends them to the obstacle processing unit 220.

The obstacle processing unit 220 is connected to the obstacle information collecting unit 210 and the display control unit 130. The obstacle processing unit 220 performs a process for excluding position information from the position information of the obstacle received from the obstacle information collecting unit 210 according to a setting and sends, to the display control unit 130, the position information in which the exclusion process has been made.

Feature and Arrangement of Cameras

Figure 4:
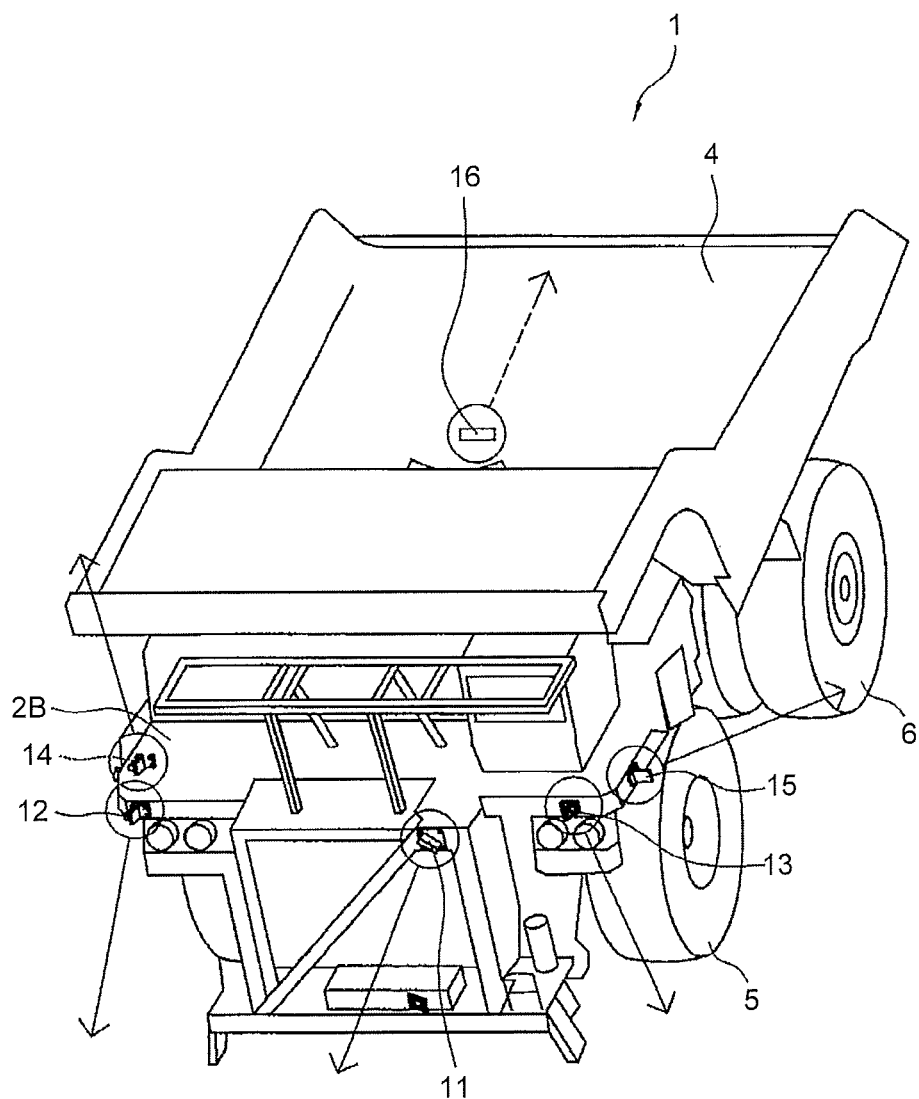
FIG. 4 is a view illustrating an installation position of each camera provided to the dump truck.

As illustrated in FIG. 4, respective cameras 11 to 16 are attached to the outer peripheral of the dump truck 1, respectively, in order to obtain the images ranging 360 degrees around the dump truck 1. Each of the cameras 11 to 16 has a view range of 120 degrees in the lateral (horizontal) direction and 96 degrees in the height (vertical) direction.

Figure 5:
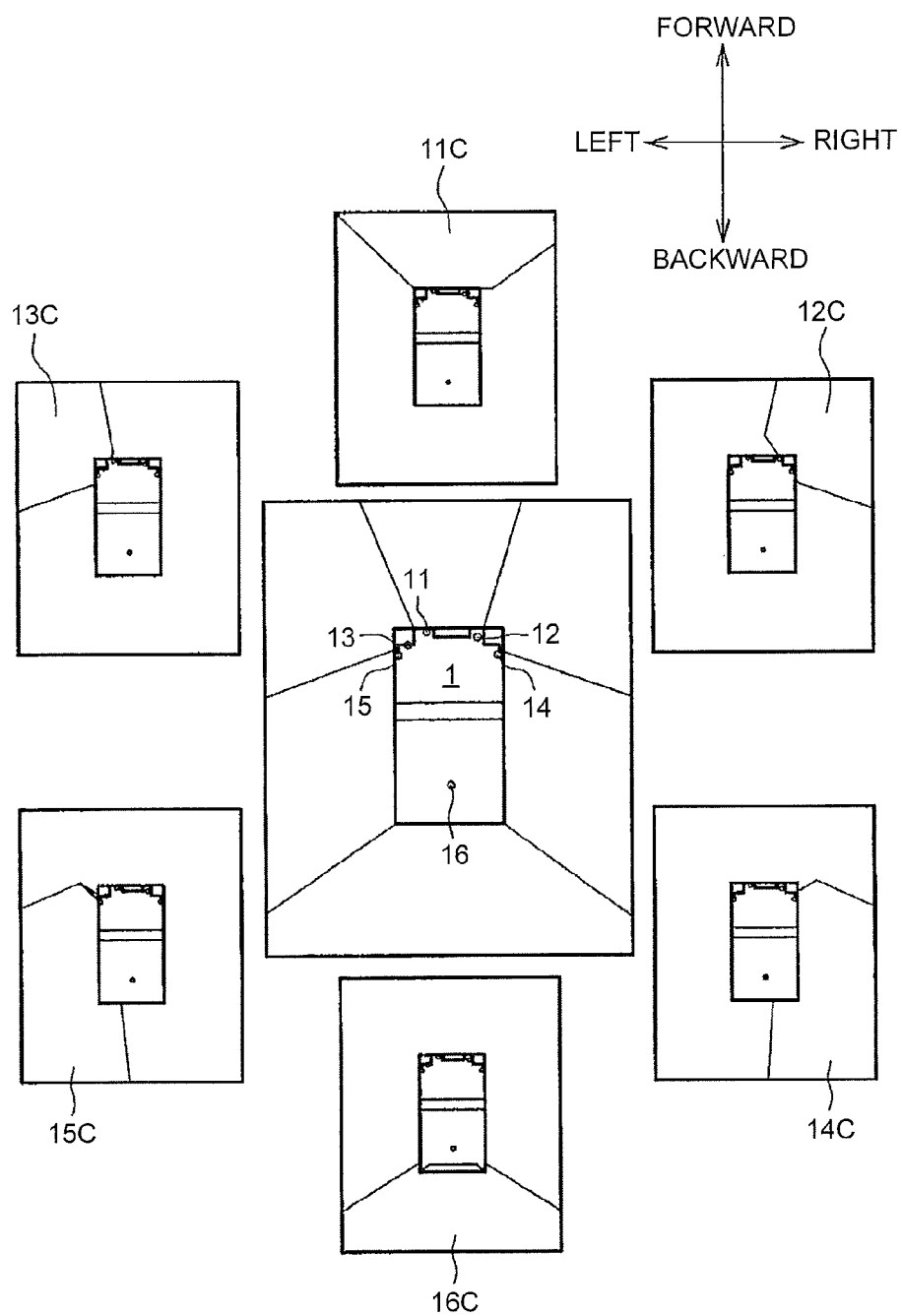
FIG. 5 is a view illustrating imaging ranges of respective cameras.

The camera 11 is a camera for imaging the forward direction of the vehicle and is arranged under the landing at the upper most step of the diagonal ladder 2D, as illustrated in FIG. 4. The camera 11 is fixed via a bracket attached to the upper deck 2B so as to face forward from the vehicle. The imaging range of the camera 11 is an imaging range 11C spreading forward of the vehicle in the imaging area whose reference is the ground as illustrated in FIG. 5.

The camera 12 is a camera for imaging the right oblique side-forward direction of the vehicle and is arranged close to the right end of the front side surface of the upper deck 2B, as illustrated in FIG. 4. The camera 12 is fixed via a bracket attached to the upper deck 2B so as to face right oblique forward from the vehicle. The imaging range of the camera 12 is an imaging range 12C spreading right oblique forward of the vehicle in the imaging area whose reference is the ground as illustrated in FIG. 5.

The camera 13 is a camera for imaging the left oblique side-backward direction of the vehicle and is fixed at the laterally symmetrical position of the camera 12, that is, via a bracket attached to the upper deck 2B so as to face left oblique backward from the vehicle. The imaging range of the camera 13 is an imaging range 13C spreading left oblique backward of the vehicle in the imaging area whose reference is the ground as illustrated in FIG. 5.

The camera 14 is a camera for imaging the right oblique side-backward direction of the vehicle and is arranged close to the right end of the front side surface of the upper deck 2B, as illustrated in FIG. 4. The camera 14 is fixed via a bracket attached to the upper deck 2B so as to face right oblique backward from the vehicle. The imaging range of the camera 14 is an imaging range 14C spreading right oblique backward of the vehicle in the imaging area whose reference is the ground as illustrated in FIG. 5.

The camera 15 is a camera for imaging the left oblique side-backward direction of the vehicle and is arranged at the laterally symmetry position of the camera 14 with respect to the vehicle center plane C, as illustrated in FIG. 4. The camera 15 is fixed via a bracket attached to the upper deck 2B so as to face left oblique backward from the vehicle. The imaging range of the camera 15 is an imaging range 15C spreading left oblique backward of the vehicle in the imaging area whose reference is the ground as illustrated in FIG. 5.

The camera 16 is a camera for imaging the backward direction of the vehicle, is arranged above the rear axle connecting two rear wheels 6 and close to the revolve shaft of the vessel 4 at the rear end of the body frame 2, and is fixed via a bracket attached to the cross member so as to face backward from the vehicle. The imaging range of the camera 16 is an imaging range 16C spreading backward of the vehicle in the imaging area whose reference is the ground as illustrated in FIG. 5.

The use of these cameras 11 to 16 allows for obtaining the images of the entire surroundings of the dump truck 1, as illustrated in the center figure of FIG. 5. In addition, the cameras 11 to 16 send the captured images to the controller 100, respectively.

Further, the cameras 11 to 16 are provided to the upper deck 2B and the cross member at higher positions of the body frame. Therefore, the captured image to overlook the ground from the upper position can be obtained by each of the cameras 11 to 16, so that the obstacle on the ground in a wide area can be imaged. Further, even when the view point conversion has been made in forming the bird's-eye image, the use of the image imaged from the upper position allows for the suppression of the degree of deformation for the three-dimensional object.

Feature and Arrangement of Radars

The radars 21 to 28 each has an azimuth (horizontal) direction of 80 degrees (±40 degrees) and an up-and-down (vertical) direction of 16 degrees (±8 degrees), and is a UWB (Ultra Wide Band) radar whose detection distance is equal to or longer than 15 m at the maximum. The relative position of the obstacle occurring in the entire surroundings of the dump truck 1 is detected by the installed radars 21 to 28. Each of the radars 21 to 28 is arranged on the outer peripheral of the dump truck 1. It is noted that, although the detection angle in the azimuth (horizontal) direction of each of the radars 21 to 28 is 80 degrees (±40 degrees), the detection angle may be wider than the above.

Figure 6:
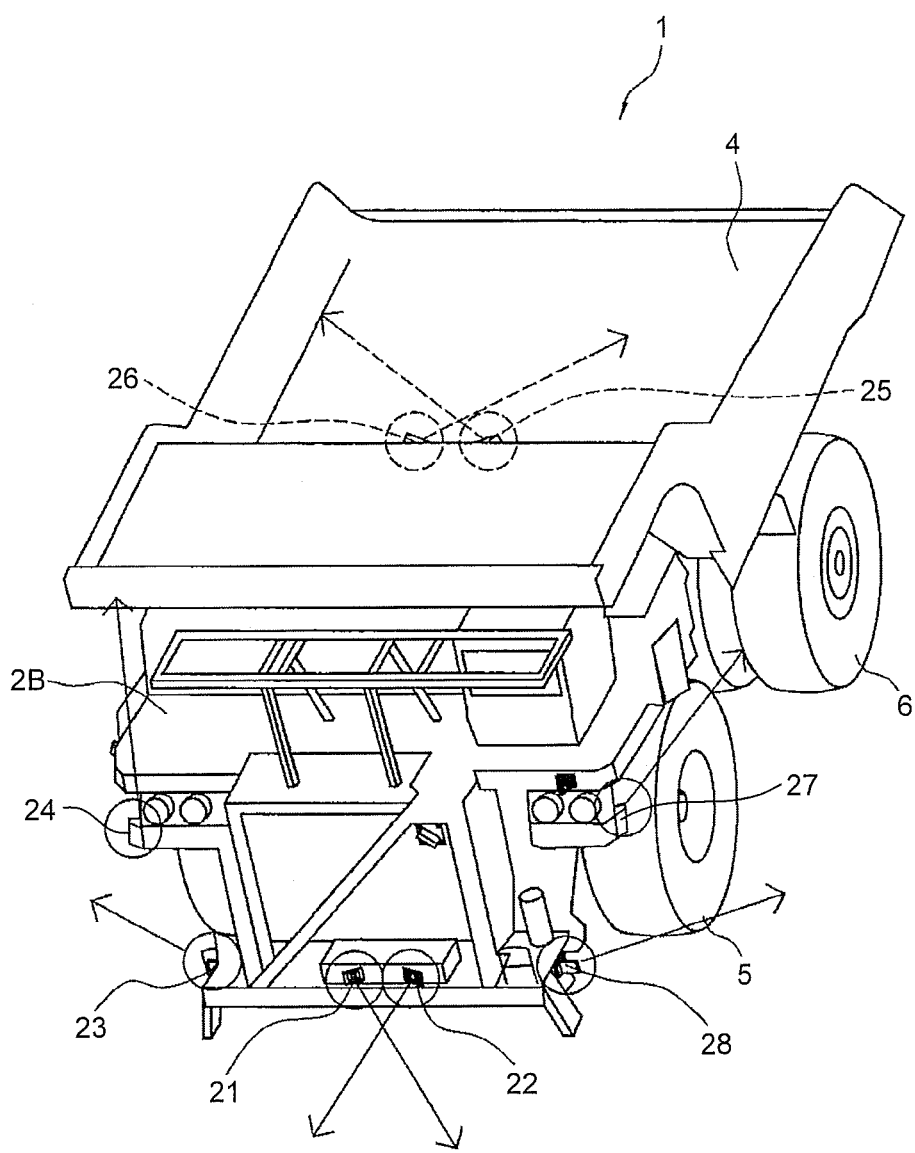
FIG. 6 is a view illustrating installation positions of respective radars provided to the dump truck.
Figure 7:
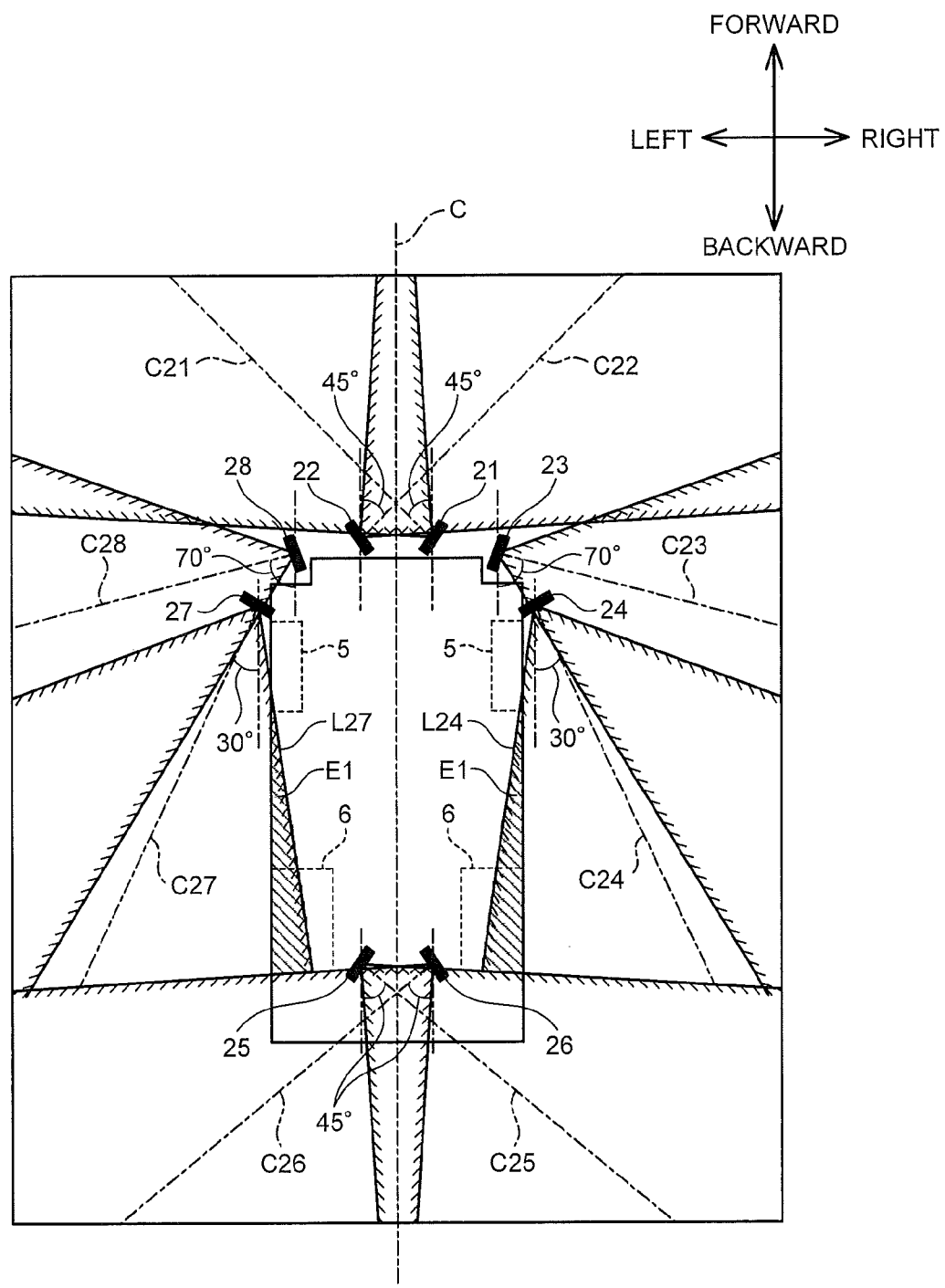
FIG. 7 is a view illustrating detection ranges of respective radars.
Figure 8:
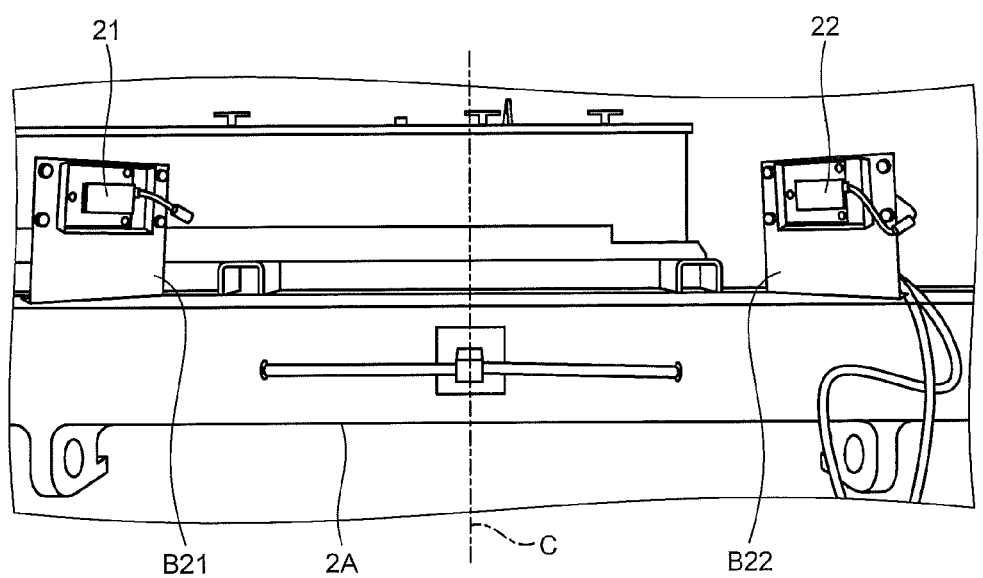
FIG. 8 is a view illustrating a specific arrangement of the radars for detection in the forward direction of the vehicle.

The radars 21 and 22 will be described by referring to FIG. 6 and FIG. 8 that are the front view of the dump truck 1. The radars 21 and 22 are provided on the lower deck 2A under the ladder 2D at the height of about 1 m from the ground located under the upper deck 2B to which the camera 11 for mainly imaging the forward direction of the vehicle is provided. The radars 21 and 22 are attached via brackets B21 and B22, respectively, symmetrically with respect to the vehicle center plane C. The radar 21 is arranged facing to the forward oblique left direction, while the radar 22 is arranged facing to the forward oblique right direction. Specifically, as illustrated in FIG. 7, a horizontal irradiation center axis C21 of the radar 21 is tilted by 45 degrees to the left of the vehicle with respect to the forward direction axis of the vehicle center plane C, a horizontal irradiation center axis C22 of the radar 22 is tilted by 45 degrees to the right of the vehicle with respect to the forward direction axis of the vehicle center plane C, and the irradiation center axes C21 and C22 cross each other. Further, each irradiation center axis in the vertical direction of the radars 21 and 22 has an angle of dip of about 5 degrees. This allows for the detection of all the obstacles in the area in front of the front end of the vehicle.

Figure 9:
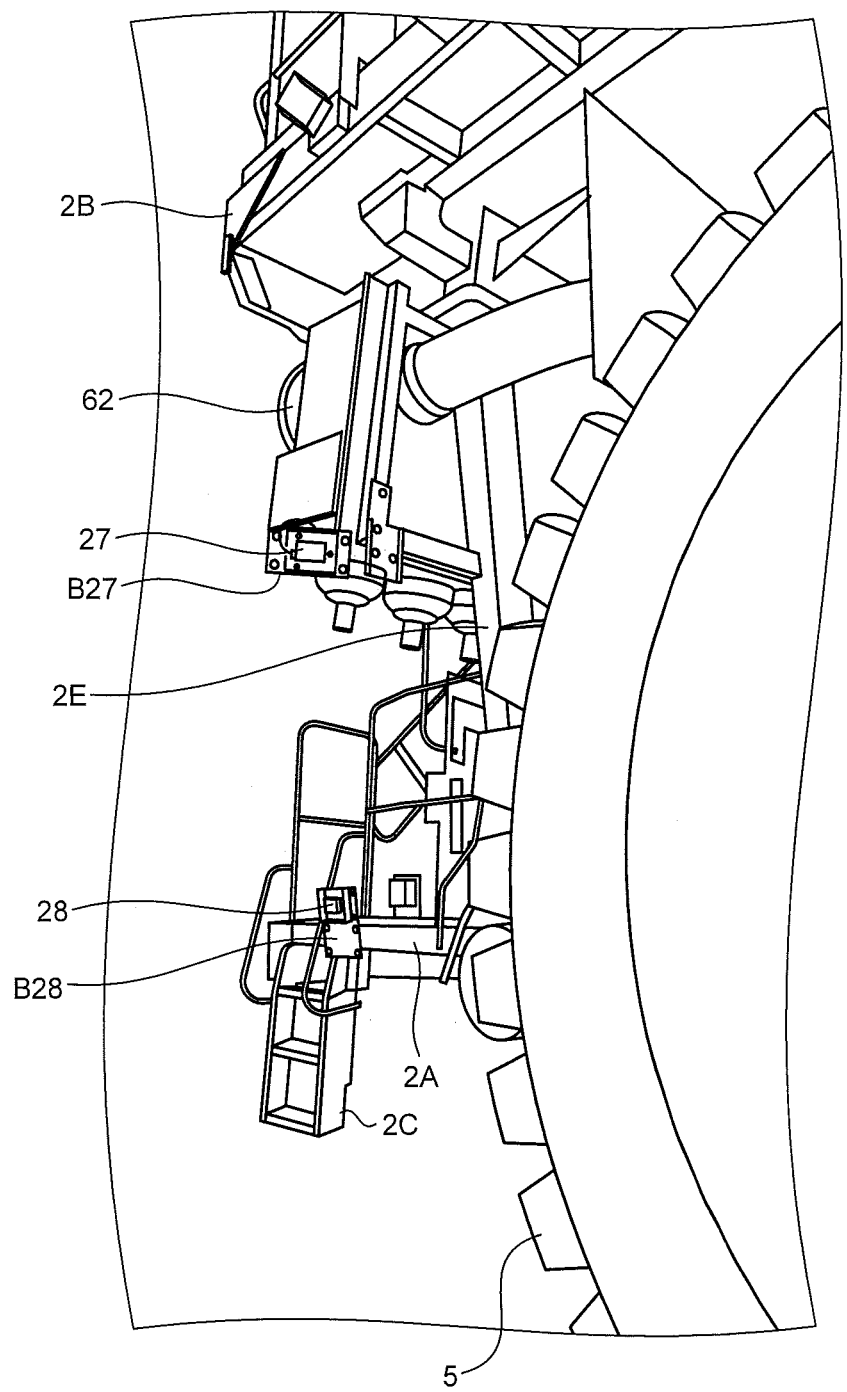
FIG. 9 is a view illustrating a specific arrangement of the radars for detection in the left side direction of the vehicle.
Figure 10:
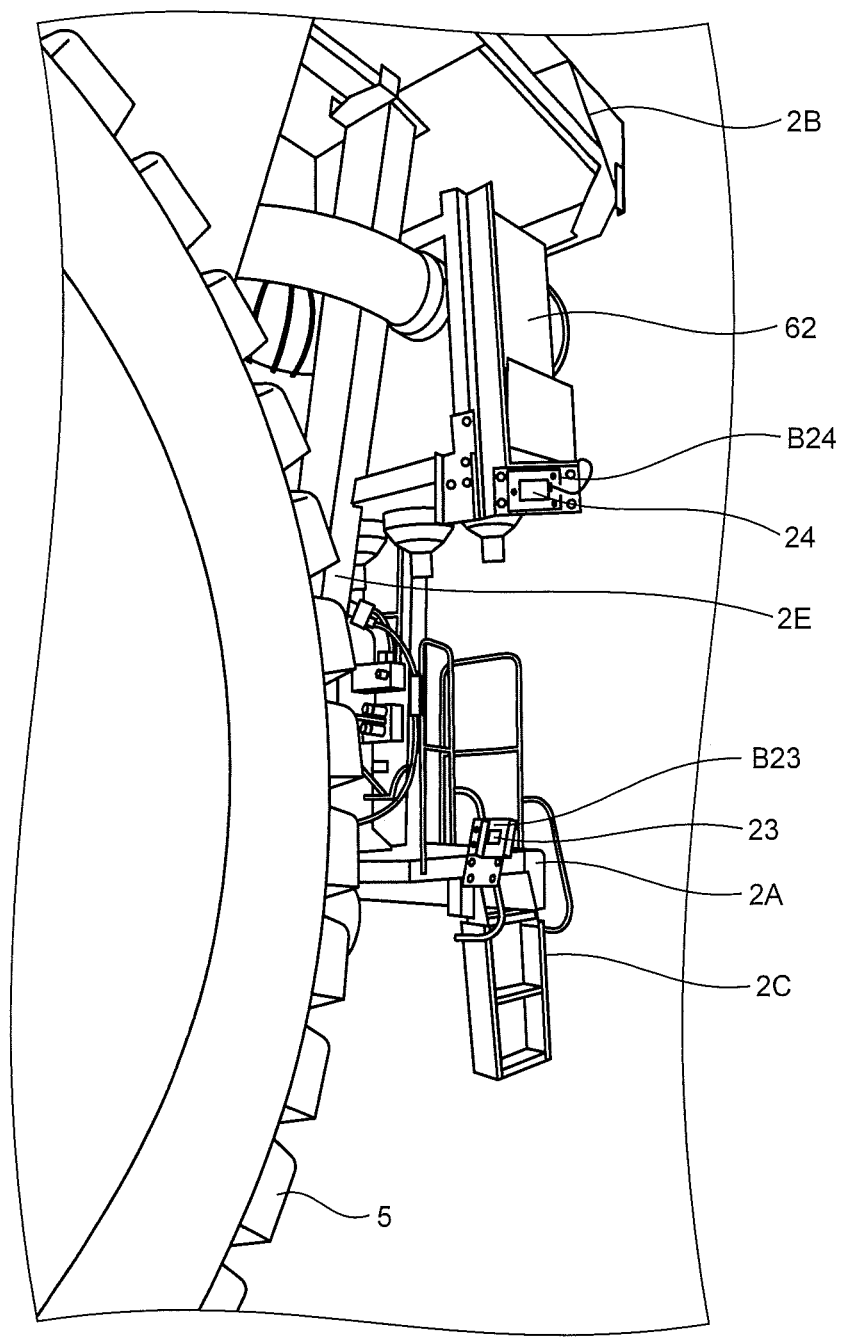
FIG. 10 is a view illustrating a specific arrangement of the radars for detection in the right side direction of the vehicle.

The radar 28 and the radar 23 positioned symmetrically with respect to the vehicle center plane C will be described by referring to FIG. 6, FIG. 9 that is the side view from the left side of the dump truck 1, and FIG. 10 that is the side view from the right side of the dump truck 1. The radar 28 is provided near the left end of the lower deck 2A located under the upper deck 2B, that is, near the upper end of the ladder 2D to which the cameras 13 and 15 for mainly imaging the left side direction of the vehicle are provided. The radar 28 is attached to the lower deck 2A via a bracket B28 and arranged facing left side outward from the vehicle.

The radar 23 is positioned laterally symmetrically to the installed radar 28 with respect to the vehicle center plane C in the side view from the left side of the dump truck 1. The radar 23 is provided near the right end of the lower deck 2A located under the upper deck 2B, that is, near the upper end of the ladder 2C to which the cameras 12 and 14 for mainly imaging the right side direction of the vehicle are provided. The radar 23 is attached to the lower deck 2A via a bracket B23 provided laterally symmetrically to the bracket B28 with respect to the vehicle center plane C and is arranged facing right side outward from the vehicle.

The specific attachment of the radars 23 and 28 is illustrated in FIG. 7. The horizontal irradiation center axis C23 of the radar 23 is tilted by 70 degrees to the right of the vehicle with respect to the backward direction axis of the vehicle center plane C, and the horizontal irradiation center axis C28 of the radar 28 is tilted by 70 degrees to the left of the vehicle with respect to the backward direction axis of the vehicle center plane C. Further, each irradiation center axis in the vertical direction of the radars 23 and 28 has an angle of dip of about 5 degrees.

The radars 23 and 28 allows for the detection of the obstacle in the side, in particular, in front of the front wheels 5 and the rear wheels 6 of the dump truck 1. Further, the radars 23 and 28 are positioned under the vessel 4 and the upper deck 2B and thus is not affected by the fly rock that may fly out of the vessel 4 at the loading.

The radar 27 and the radar 24 positioned symmetrically with respect to the vehicle center plane C will be described by referring to FIG. 6, FIG. 9 that is the side view from the left side of the dump truck 1, and FIG. 10 that is the side view from the right side of the dump truck 1. The radar 27 is arranged to the side end of an air cleaner 62 provided to the position projected toward the side from the front fender 2E on the left side of the vehicle extended toward the lower deck 2A located under the upper deck 2B to which the cameras 13 and 15 for mainly imaging the left side direction of the vehicle are provided. The radar 27 is attached to the front fender 2E via a bracket B27 and attached facing backward from the vehicle. The height of the radar 27 is about 2.5 m from the ground.

The radar 24 is positioned laterally symmetrically to the installed radar 27 with respect to the vehicle center plane C from the left side of the dump truck 1 in the side view. The radar 24 is arranged to the side end of the air cleaner 62 provided to the position projected toward the side from the front fender 2E on the right side of the vehicle extended toward the lower deck 2A located under the upper deck 2B to which the cameras 12 and 14 for mainly imaging the right side direction of the vehicle are provided. The radar 24 is attached to the front fender 2E via a bracket B24 and attached facing backward from the vehicle.

The specific attachment of the radars 24 and 27 is illustrated in FIG. 7. The horizontal irradiation center axis C24 of the radar 24 is tilted by 30 degrees to the right of the vehicle with respect to the backward direction axis of the vehicle center plane C, and the horizontal irradiation center axis C27 of the radar 27 is tilted by 30 degrees to the left of the vehicle with respect to the backward direction axis of the vehicle center plane C. It is noted that these angles are not limited to 30 degrees and may be equal to or less than 45 degrees. That is, the horizontal backward detection limit lines L24 and L27 of the horizontal detection range are directed to the vehicle center plane C, and the angles may be employed which form a vehicle area E1 including the front wheels 5 and the rear wheels 6 in the irradiation area. These irradiation center axes C24 and C27 preferably cross to the front wheels 5 and are oriented to the grounding portions of the rear wheels 6. Further, each irradiation center axis in the vertical direction of the radars 24 and 27 has an angle of dip of about 15 degrees.

The radars 24 and 27 allows for the detection of the obstacle in the side-backward area corresponding to the backward of the center axis lines of the front wheels 5 and the rear wheels 6 in the side of the dump truck 1, in particular, corresponding to the entire side area of the vessel. Further, the radars 24 and 27 are positioned under the vessel 4 and the upper deck 2B and thus are not affected by the fly rock that may fly out of the vessel 4 at the loading.

As illustrated in FIG. 7, the side detection range in the horizontal direction of the radars 23 and 24 and the side detection range in the horizontal direction of the radars 27 and 28 have overlapping areas, respectively, so that the obstacle in the both side areas from the front end to the rear end of the vehicle can be detected by the radars 23, 24, 27, and 28. Further, the obstacle in the right side of the vehicle which would otherwise be difficult to view from the cab 3 can be detected by the radars 23 and 24 arranged to the right side of the vehicle that is the symmetrical position of the left side of the vehicle in which the cab 3 is arranged.

Figure 11:
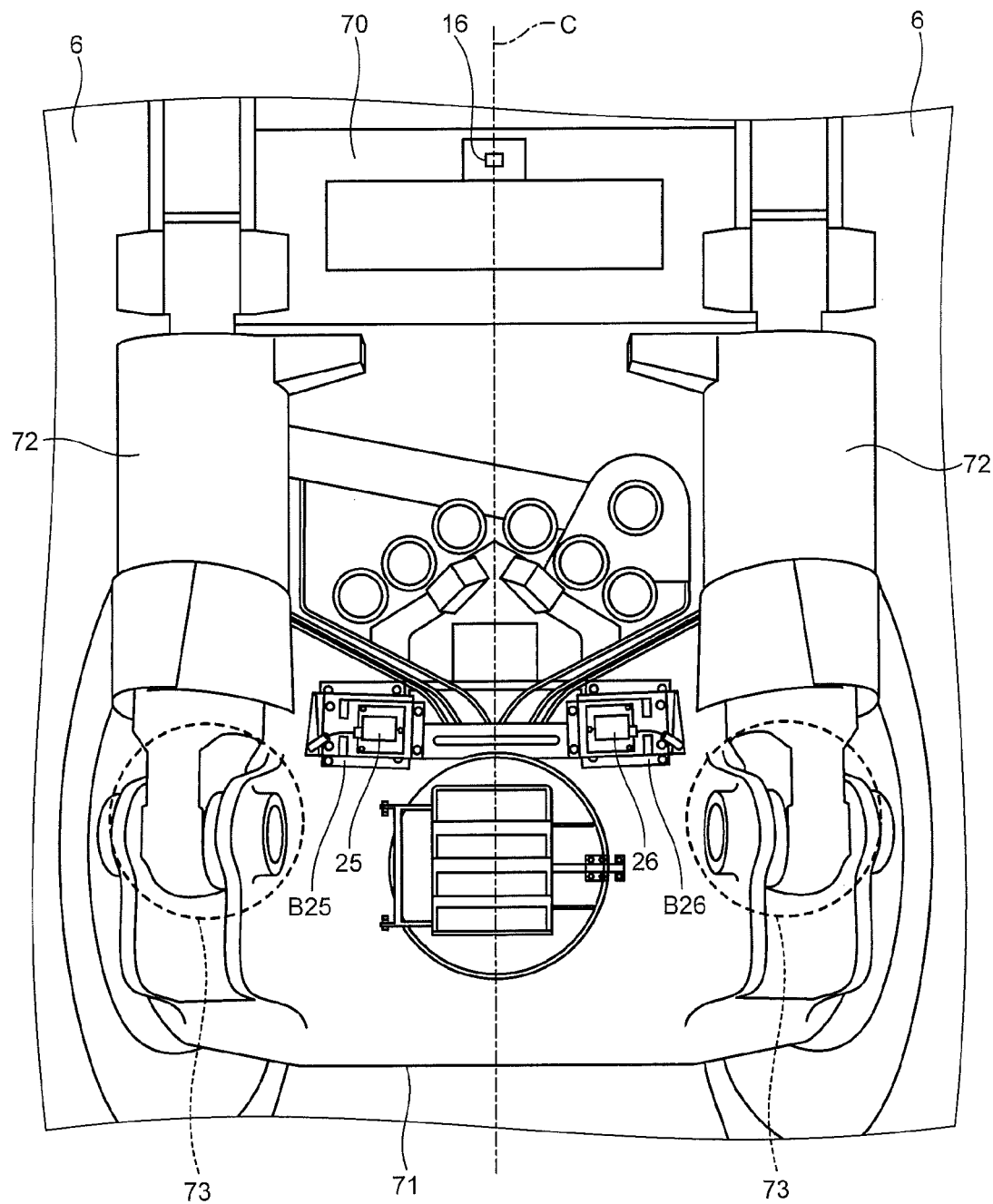
FIG. 11 is a view illustrating a specific arrangement of the radars for detection in the backward direction of the vehicle.

The radars 25 and 26 will be described by referring to FIG. 6 and FIG. 11 that is the rear view of the dump truck 1. The radars 25 and 26 are located at the height of about 2 m from the ground, and arranged in the backside of the case of a rear axle 71 of the driving shaft of the rear wheels 6 positioned under a cross member 70 of the vessel 4 on which the camera 16 is installed. The radars 25 and 26 are attached via brackets B25 and B26, respectively, symmetrically with respect to the vehicle center plane C. Further, the radars 25 and 26 are provided between joints 73 of rear suspension cylinders 72. The radar 25 is arranged facing in the backward oblique right direction, while the radar 26 is arranged facing in the backward oblique left direction.

As illustrated in FIG. 7, a horizontal irradiation center axis C25 of the radar 25 is tilted by 45 degrees to the right of the vehicle with respect to the backward direction axis of the vehicle center plane C, a horizontal irradiation center axis C26 of the radar 26 is tilted by 45 degrees to the left of the vehicle with respect to the backward direction axis of the vehicle center plane C, and the irradiation center axes C25 and C26 cross to each other under the vessel 4. Further, each irradiation center axis in the vertical direction of the radars 25 and 26 has an angle of dip of 0 to 10 degrees, in particular, an angle of dip of about 5 degrees in this embodiment.

Figure 12:
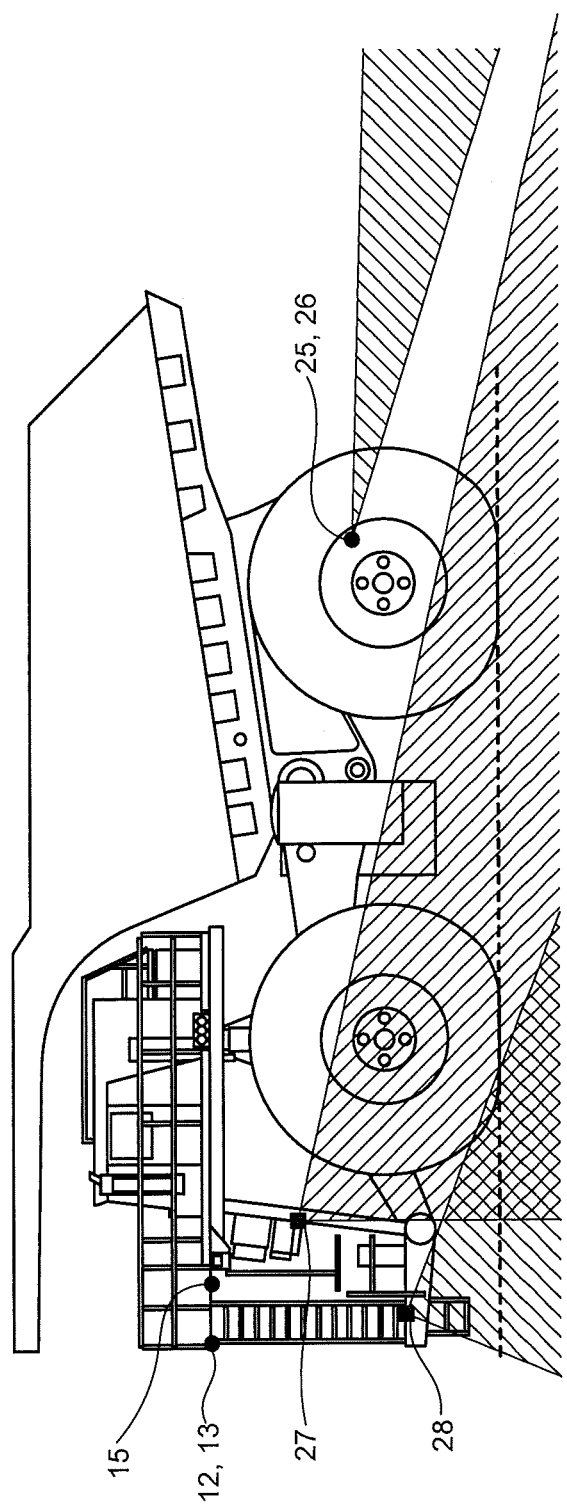
FIG. 12 is a view illustrating the left side of the vehicle and the irradiation state of the radars.
Figure 13:
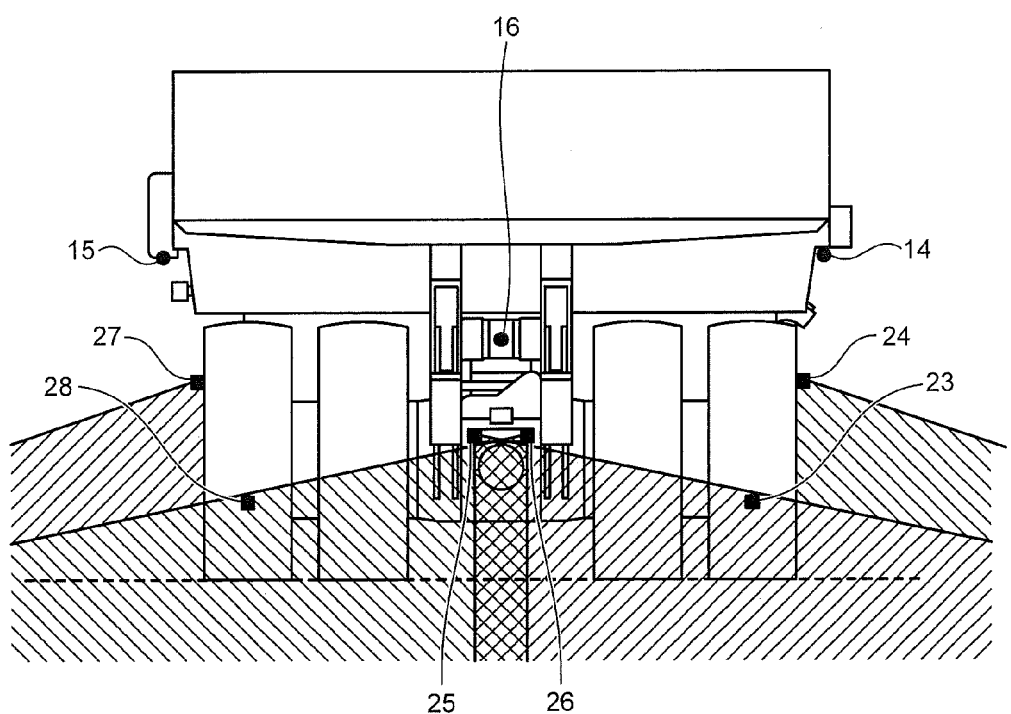
FIG. 13 is a view illustrating the backward direction of the vehicle and the irradiation state of the radars.

The radars 25 and 26 are attached symmetrically with respect to the vehicle center plane C and installed so that their irradiation center axes cross, and therefore all the obstacles in the backside area of the rear end of the vehicle can be detected. In particular, the radars 25 and 26 are arranged with a small angle of dip on the case of the rear axle 71, the position of which is lower than the cross member 70. As illustrated in FIG. 12 and FIG. 13, the radars 25 and 26 installed to the lower position of the vehicle with the small angle of dip allow for the detection of the obstacle in the distance of the vehicle and the obstacle behind the vessel 4 at the same time. It is noted that, although the horizontal irradiation center axis C25 of the radar 25 and the horizontal irradiation center axis C26 of the radar 26 are tilted by 45 degrees with respect to the vehicle center plane C, these angles may be less than 45 degrees, for example, may be 30 degrees. This value may be determined according to the degree of the backward projection of the radars 25 and 26 with respect to the rear end of the wheels 6.

The radars 21 to 28 for detecting the obstacle in respective directions of the vehicle are attached to the members in the lower positions than the cameras 11 to 16 for imaging respective directions of the vehicle to generate the bird's-eye images. Even when the radar having smaller angle in the vertical direction is used, installation of the radar at the lower position than the camera allows for displaying the obstacle information detected by the radar into the bird's-eye image, also in the bird's-eye image imaged and generated by the camera.

Obstacle Detection Process Based on Detected Data from Radars 21 to 28

Figure 14:
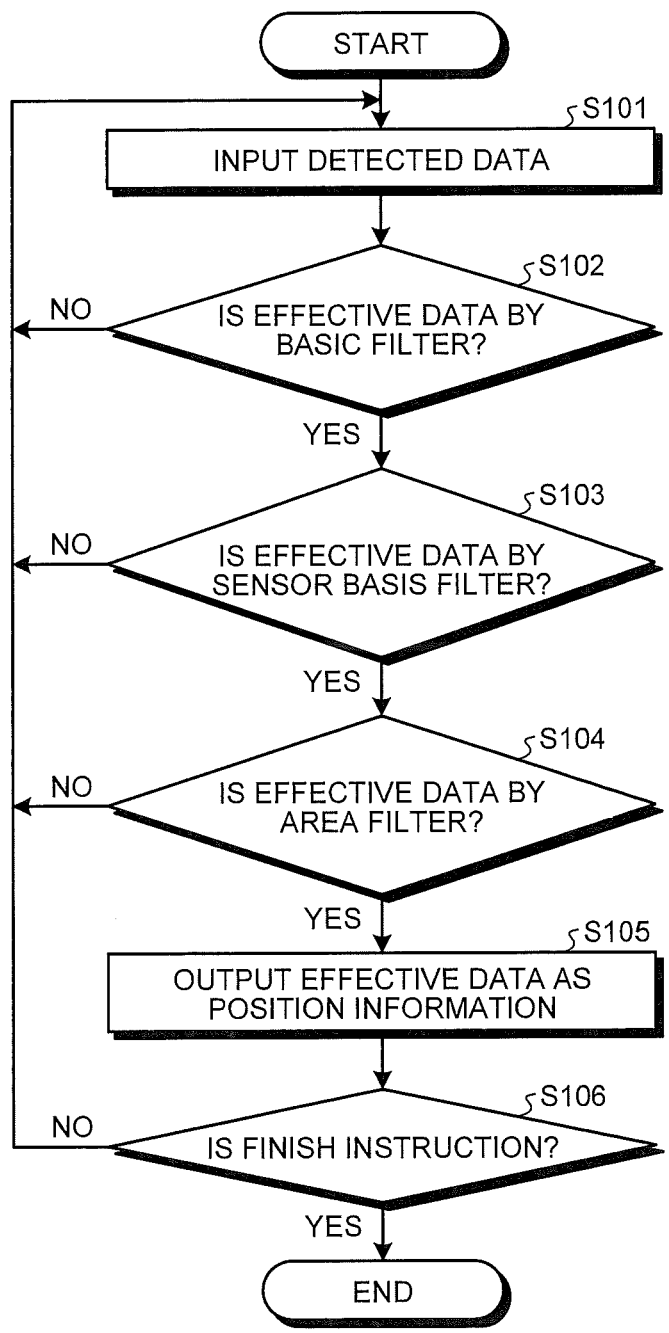
FIG. 14 is a flowchart illustrating a procedure of an obstacle detection process based on detected data by the radars.

Hereafter, by referring to the flowchart illustrated in FIG. 14, described will be the procedure of the obstacle detection process based on the detected data of the radars 21 to 28. First, the obstacle processing unit 220 inputs, from the obstacle information collecting unit 210, a predetermined scan number of radar detection data for each radars 21 to 28 (step S101). Then, a basic filter is used to determine whether or not there is effective data for the radar detection data (step S102). This basic filter (pre-processing filter) outputs, as the effective data, those having an effective detection range indicating a size about an automobile within the radar detection range (effective scan angle and effective distance) and having a predetermined minimum reflection signal intensity, for example.

If there is effective data in the basic filter (step S102, Yes), it is determined whether or not among the effective data there is effective data that is validated by a filter by sensor (step S103). The filter by sensor performs the filtering based on each specification of the filters, in which the radar detection range is divided into several areas in accordance with the radar detection capability, and outputs the data satisfying the condition for every area as the effective data. Because, in the reflected signal, the intensity is reduced in the far area, the time resolution is degenerated in the near area, and the detection capability may be different according to the scan angle.

If there is effective data that is validated by the filter by sensor (step S103, Yes), it is further determined whether or not among the effective data there is effective data that is validated by an area filter (step S104). If there is a preset vehicle area indicating the inside of the vehicle, the area filter deletes the effective data in the inside of the vehicle area.

If there is effective data that is validated by the area filter (step S104, Yes), this effective data is outputted to the display control unit 130 as the position information (step S105). Then, it is determined in the controller 100 whether or not there is a finish instruction of the process (step S106) and, if there is a finish instruction (step S106, Yes), the process ends. It is noted that, if there is no effective data by the basic filter (step S102, No), if there is no effective data validated by the filter by sensor (step S103, No), if there is no effective data validated by the area filter (step S104, No), and if there is no finish instruction (step S106, No), the process enters step S101 and repeats the above process.

As described above, the obstacle processing unit 220 is configured to delete the effective data in the vehicle area by the area filter. For example, among the obstacle information detected by the radars 24 and 27, the obstacle information of the vehicle area E1 illustrated in FIG. 7 is deleted by the area filter because of not being the effective data. As a result, since the obstacle information of the vehicle area E1 is not sent out to the monitor 50 via the display control unit 130 and the monitor image generation unit 140, the obstacle information of the vehicle area E1 is not displayed on the display screen of the monitor 50.

Further, while radars 25 and 26 are arranged with the angles so as to cross the vehicle center plane C, some angle may cause the radars 25 and 26 to detect the rear suspension cylinder 72. By presetting the rear suspension cylinder 72 as the vehicle area, the area filter of the obstacle processing unit 220 can delete the obstacle information of this vehicle area, so that the rear suspension cylinder 72 is not displayed on the display screen of the monitor 50.

It is noted that the radar detection data obtained by the radars 21 to 28 may include the information of the ground. Therefore, in the obstacle processing unit 220, it is preferable to preset the area under the installation plane of the vehicle as the area to be deleted similarly to the vehicle area, and delete by the area filter the radar detection data of the ground that is lower than a predetermined height for which the rut and the like are taken into consideration.

The use of such radars 21 to 28 allows for the detection of the obstacle in the entire surroundings of the vehicle. In particular, this allows for the detection of the obstacle in the side area of the vessel and the obstacle in the backside area of the vessel rear end which would not otherwise be detected.

Figure 15:
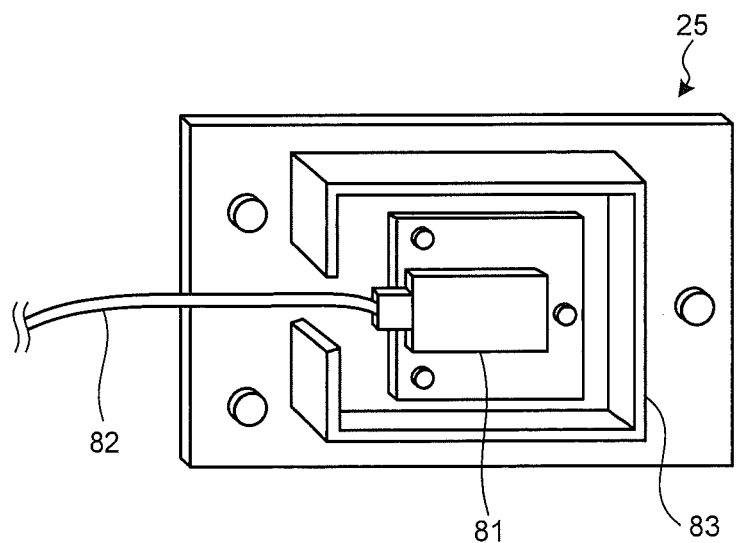
FIG. 15 is a perspective view illustrating an example of a protection member for protecting the radar.
Figure 16:
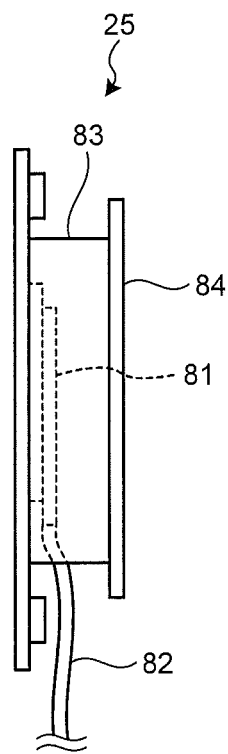
FIG. 16 is a side view illustrating another example of the protection member for protecting the radar.

In addition, each of the radars 21 to 28 is provided with a protection member 83 that is a hood surrounding the peripheral of a radar body 81 as seen in the radar 25 illustrated in FIG. 15 and FIG. 16. The protection member 83 has a notch for drawing out a cable 82. The protection member 83 can serve as the fender to the irradiating part of the radar and maintain the detection function of the radar. Further, the protection member 83 can prevent the radar from being damaged due to the rock fly.

Furthermore, another protection member 84 may be provided to cover the opening of the space surrounded by the protection member 83, that is, the opening in the irradiation side. The protection member 84 is for a front protection and thus is required to be a member not only having strength but also having transparency to the radar signal. Further, the transparent member is preferable. Because, such transparency allows for the visual observation of the condensation and the like on the surface of the radar body 81. The protection member 84 is formed with polycarbonate, for example.

Figure 17:
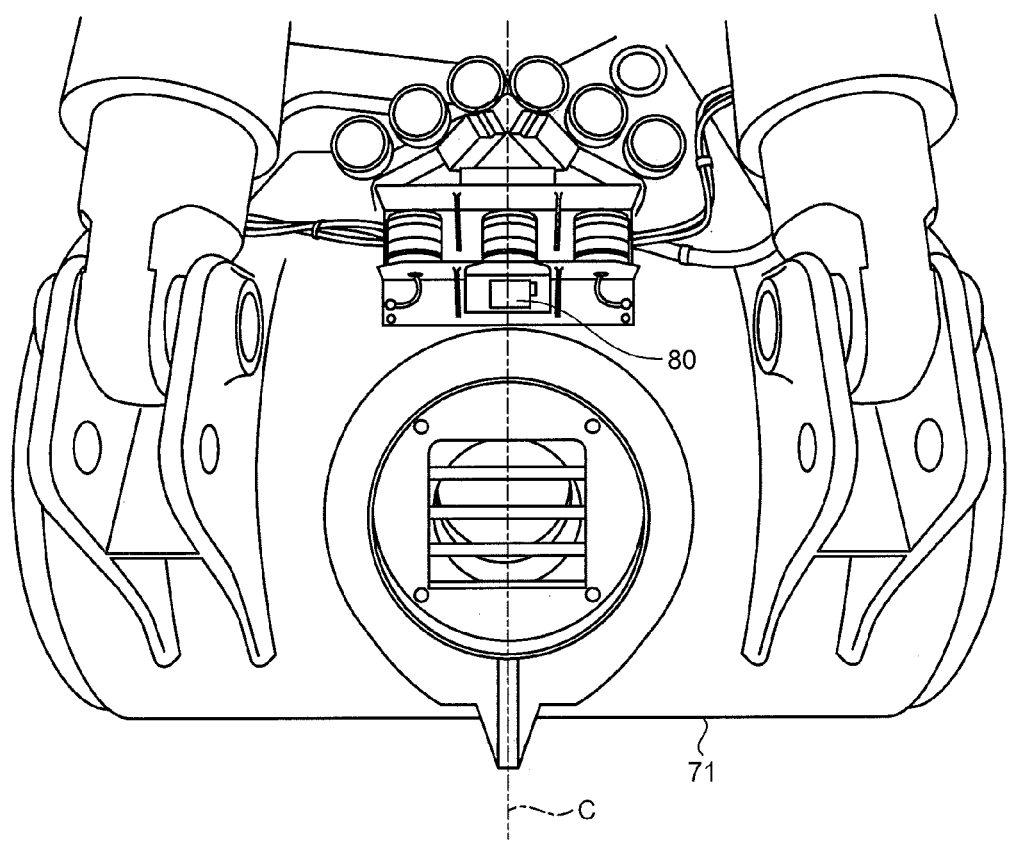
FIG. 17 is a view illustrating another example of the arrangement of the radar for detection of the backward direction of the vehicle.

It is noted that, although a pair of radars 25 and 26 for detecting the obstacle in the backward direction are provided, it is not limited to it and one radar may be provided to the center of the rear axle 71 and between the joints of the rear suspension cylinders as illustrated in FIG. 17 when a radar 80 having a wider angle close to 180 degrees in the horizontal direction is used. In this case, even when the radar having smaller angle in the vertical direction is used, the radar installed to the lower position of the vehicle allows for the detection of the obstacle distant from the vehicle. Further, although a pair of laterally symmetrical radars have been described in the embodiment, the position of the radars may not be laterally symmetrical as long as the radars are positioned so that the obstacle can be detected.

Further, the dump truck as described above can be applied to the dump truck in an unattended dump truck operation system that is wirelessly managed. In this case, when an obstacle is detected by the radars 21 to 28, the control for preventing collision is made by an emergency stop.

REFERENCE SIGNS LIST

1 dump truck
2 body frame
2A lower deck
2B upper deck
2C, 2D ladder
2E front fender
3 cab
4 vessel
5 front wheel
6 rear wheel
7 base
10 periphery monitoring device
11 to 16 camera
21 to 28, 80 radar
31 driver seat
32 handle
33 dash cover
34 radio device
35 radio broadcast receiver
36 retarder
37 shift lever
50 monitor
62 air cleaner
70 cross member
71 rear axle
72 rear suspension cylinder
73 joint
100 controller
110 bird's-eye image composition unit
120 camera image switching/view point conversion unit
130 display control unit
140 monitor image generation unit
210 obstacle information collecting unit
220 obstacle processing unit
300 pickup truck
B21, B22, B25, B26, B27, B28 bracket
C vehicle center plane
C21 to C28 irradiation center axis
E1 vehicle area
L24, L27 horizontal backward detection limit line

The invention claimed is:

1. A dump truck with an obstacle detection mechanism capable of detecting an obstacle around a vehicle using a plurality of radars provided on a periphery of the vehicle, the dump truck comprising:
   a backward irradiation side-radar attached, facing backward, to a position projected sideward from a front fender extended from a lower deck to an upper deck of a front side of the vehicle, wherein an irradiation beam from the backward irradiation side-radar has an angle of dip to cross at least a front wheel; and
   a sideward irradiation side-radar attached, facing sideward, to a side of the lower deck,
   wherein the backward irradiation side-radar and the sideward irradiation side-radar are arranged such that a horizontal forward detection limit line of the backward irradiation side-radar and a horizontal backward detection limit line of the sideward irradiation side-radar overlap and the horizontal backward detection limit line of the backward irradiation side-radar is directed to a side of a center plane of the vehicle to detect an obstacle in a side of the vehicle.

2. The dump truck according to claim 1, wherein a horizontal detection range of the backward irradiation side-radar is equal to or greater than 80 degrees and an angle between a horizontal irradiation center axis of the backward irradiation side-radar and the center plane of the vehicle is equal to or less than 45 degrees.

3. The dump truck according to claim 1, wherein an obstacle processing unit having the obstacle detection mechanism excludes information of a vehicle area detected by the backward irradiation side-radar from obstacle detection information.

4. The dump truck according to claim 1, wherein the backward irradiation side-radar and the sideward irradiation side-radar are provided under a vessel.

5. The dump truck according to claim 1, wherein the backward irradiation side-radar and the sideward irradiation side-radar are provided to an opposite side of a cab with respect to the center plane of the vehicle.

6. A dump truck with an obstacle detection mechanism capable of detecting an obstacle around a vehicle using a plurality of radars provided on a periphery of the vehicle, the dump truck comprising:
- a plurality of backward radars arranged in left and right with respect to a center plane of the vehicle in a backside of a rear axle case and between joints of rear suspension cylinders and the rear axle case, wherein respective radars are arranged such that irradiation center axes of the radars in a horizontal direction cross and irradiation center axes of the radars in a vertical direction have a predetermined angle of dip, respectively;
- a plurality of forward radars arranged in left and right with respect to the center plane of the vehicle in a front part of a lower deck of a front side of the vehicle, wherein respective radars are arranged such that irradiation center axes of the radars in a horizontal direction cross and irradiation center axes of the radars in a vertical direction have a predetermined angle of dip, respectively;
- backward irradiation side-radars arranged in left and right and attached, facing backward, to positions projected sideward from a front fender extended from the lower deck to an upper deck, wherein each of horizontal backward detection limit lines of the backward irradiation side-radars is directed to a side of the center plane of the vehicle and each of irradiation center plane of the backward irradiation side-radars in a vertical direction has an angle of dip to cross at least a front wheel; and
- sideward irradiation side-radars arranged in left and right and attached, facing sideward, to sides of the lower deck, wherein each of horizontal detection ranges of the sideward irradiation side-radars includes a horizontal forward detection limit line of the backward irradiation side-radar,
- wherein the dump truck detects obstacle around entire surroundings of the vehicle.

7. A method of obstacle detection in a dump truck with an obstacle detection mechanism attached, facing backward, to a position projected sideward from a front fender extended from a lower deck to an upper deck of a front side of the vehicle and capable of detecting an obstacle in a side of a vehicle, the method comprising:
- detecting obstacle information by a backward irradiation side-radar whose irradiation beam has an angle of dip to cross a front wheel; and
- excluding obstacle information in a preset vehicle area that indicates the vehicle.

* * * * *